(12) United States Patent
Menzel et al.

(10) Patent No.: US 11,599,678 B2
(45) Date of Patent: Mar. 7, 2023

(54) METHOD FOR ENSURING THE INTEGRITY OF DATA TO ENSURE OPERATIONAL SAFETY AND VEHICLE-TO-X DEVICE

(71) Applicants: Continental Teves AG & Co. oHG, Frankfurt am Main (DE); Continental Automotive Systems, Inc., Auburn Hills, MI (US)

(72) Inventors: Marc Menzel, Weimar (DE); Ulrich Stählin, Rochester, MI (US)

(73) Assignees: CONTINENTAL TEVES AG & CO. OHG, Frankfurt am Main (DE); CONTINENTAL AUTOMOTIVE SYSTEMS, INC., Auburn Hills, MI (US)

( * ) Notice: Subject to any disclaimer, the term of this patent is extended or adjusted under 35 U.S.C. 154(b) by 387 days.

(21) Appl. No.: 16/574,291

(22) Filed: Sep. 18, 2019

(65) Prior Publication Data
US 2021/0081571 A1 Mar. 18, 2021

(51) Int. Cl.
G06F 21/64 (2013.01)
H04W 4/40 (2018.01)
H04W 12/10 (2021.01)

(52) U.S. Cl.
CPC ............ *G06F 21/645* (2013.01); *H04W 4/40* (2018.02); *H04W 12/10* (2013.01)

(58) Field of Classification Search
CPC ........ G06F 21/645; H04W 4/40; H04W 12/10
USPC ......................................................... 726/26
See application file for complete search history.

(56) References Cited

U.S. PATENT DOCUMENTS

| 7,712,139 | B2 | 5/2010 | Westendorf et al. |
| 10,650,621 | B1* | 5/2020 | King .................. H04L 67/12 |
| 2002/0042878 | A1* | 4/2002 | Westendorf .......... H04L 9/3247 |
| | | | 713/169 |
| 2003/0162527 | A1* | 8/2003 | Dorenbeck ............ H04R 1/005 |
| | | | 455/410 |

(Continued)

FOREIGN PATENT DOCUMENTS

EP    1185026 B2    2/2017

OTHER PUBLICATIONS

German Examination Report for German Application No. 10 2020 210 876.5, dated May 25, 2021, 7 pages.

*Primary Examiner* — Dereena T Cattungal
(74) *Attorney, Agent, or Firm* — RatnerPrestia

(57) ABSTRACT

A method for ensuring integrity of data sent by a vehicle V2X communication device to a control module to ensure operational safety, including: receiving data transferred by vehicle-to-X communication by a first computing apparatus of the V2X communication device, storing the data in a data memory, forwarding the data to a second computing apparatus, receiving the data by the second computing apparatus, establishing whether an action is to be triggered for the data and, in response, transmitting the data to a comparison apparatus, carrying out a comparison test for the data provided by the second computing apparatus with the data stored in the data memory and, in response to the test being passed, outputting the data and/or a control instruction and/or a warning message by the V2X communication device to a control module. Furthermore, a corresponding vehicle-to-X device and the use of the device in a vehicle are disclosed.

16 Claims, 2 Drawing Sheets

(56) References Cited

U.S. PATENT DOCUMENTS

| | | | |
|---|---|---|---|
| 2009/0253552 A1* | 10/2009 | Foster | B60K 6/445 |
| | | | 477/130 |
| 2011/0080302 A1* | 4/2011 | Muthaiah | H04L 69/32 |
| | | | 340/903 |
| 2012/0150392 A1* | 6/2012 | Stahlin | H04L 67/12 |
| | | | 701/45 |
| 2015/0210258 A1* | 7/2015 | Erdem | B60T 8/00 |
| | | | 701/29.2 |
| 2016/0339926 A1* | 11/2016 | Ballmann | B60W 50/0205 |
| 2017/0207922 A1* | 7/2017 | Ando | H04L 9/30 |
| 2017/0287233 A1* | 10/2017 | Nix | G08G 1/166 |
| 2017/0310684 A1* | 10/2017 | Wagner | H04L 63/1466 |
| 2017/0316621 A1* | 11/2017 | Jefferies | G07B 15/00 |
| 2019/0210613 A1* | 7/2019 | Sun | G07C 5/0808 |
| 2020/0388091 A1* | 12/2020 | Ropel | G07C 5/008 |

\* cited by examiner

METHOD FOR ENSURING THE INTEGRITY OF DATA TO ENSURE OPERATIONAL SAFETY AND VEHICLE-TO-X DEVICE

FIELD OF THE INVENTION

The invention relates to a method for ensuring the integrity of data sent by a V2X communication device of a vehicle to a control module of the vehicle to ensure operational safety, a corresponding V2X communication device and the use thereof.

BACKGROUND OF THE INVENTION

Vehicle-to-X (V2X) communication is the state of the art or respectively advance development and is currently in the process of being standardized. The relevant standards are IEEE802.11(p), IEEE1609, SAE 2735, SAE 2945 and ETSI ITS-G5. Additionally, new standards are in the process of being drawn up at 3GPP for C-V2X or respectively LTE-V2X or respectively 5G V2X. Functional safety is described in the standard ISO 26262 for the automotive industry.

In particular, internal errors of a V2X communication device for V2X communication can result in V2X information having problems or respectively errors, said information being transferred by means of a data bus to the relevant vehicle systems utilizing the information. It can occur, by way of example, that V2X information transferred by a V2X communication device to other vehicle systems by means of a data bus is corrupted, damaged or obsolete. In particular, this can negatively influence the operational safety of a vehicle or respectively can produce safety-critical situations. Alternatively, no appropriate measures for countering potentially safety-critical situations are triggered.

SUMMARY OF THE INVENTION

An aspect of the invention is a means to ensure the safety with the lowest possible deployment of resources.

An aspect of the invention relates to a method for ensuring the integrity of data sent by a V2X communication device of a vehicle to a control module to ensure operational safety (safety), which has the following steps of:
  receiving data transferred by means of vehicle-to-X communication by a first computing apparatus of the V2X communication device,
  storing the data in a data memory,
  forwarding the data to a second computing apparatus,
  receiving the data by the second computing apparatus,
  establishing whether an action is to be triggered for the data and, in response to the fact that an action is to be triggered,
  transmitting the data to a comparison apparatus,
  carrying out a comparison test for the data provided by the second computing apparatus with the data stored in the data memory and, in response to the comparison test being passed,
  outputting the data and/or a control instruction and/or a warning message by the V2X communication device to the control module.

It can be ascertained by an aspect of the invention whether the data has been altered by the processing by means of the second computing unit, which can be ascertained on the basis of the comparison with the original data stored in the data memory. Consequently, the integrity of the data sent by the V2X communication device to the control module can be ensured, which can substantially contribute to ensuring the operational safety of the vehicle. The test is embodied in a need-based manner, wherein the second computing apparatus is configured to check whether an action is to be triggered. During the carrying out of the comparison test, the data does not necessarily have to be completely consistent. Alterations, which necessarily result from a processing by the second computing unit, can be considered and consequently nevertheless display a positive result (a pass).

If a case exists in which data sets of different V2X messages are utilized for outputting to the control module, all the data sets regarding this are checked according to a further development before being output to the control module, wherein the output is in particular only effected if the comparison test for all data sets is deemed to be passed.

A first computing apparatus is typically a module, in which incoming or respectively received vehicle-to-X messages are present at first or respectively at a very early stage of the processing, in particular in order to carry out a pre-filtering or respectively a verification of the received V2X messages. The first computing apparatus can accordingly be configured to carry out a method for pre-filtering in order to reduce the processing load and/or verification of received V2X messages. In particular, during the receipt of vehicle-to-X messages, said method is typically upstream of the second computing apparatus.

A second computing apparatus is typically a module which is configured to realize a protocol stack (or respectively communication stack) for processing the incoming or respectively received vehicle-to-X messages. Furthermore, the second computing apparatus can be configured to run software applications regarding V2X communication in particular. These software applications have information as the starting point, which can or respectively should be passed onto a vehicle bus.

The comparison apparatus and/or the data memory can, according to a further development, be comprised by the first computing apparatus.

A control module is typically a module, in particular of a vehicle system which is different from the V2X communication device and which uses the contents comprised by received vehicle-to-X messages within the framework of specific applications, for example for driver assistance systems or for safety systems. Consequently, the control module is not, in particular, comprised by the V2X communication device. The data are provided to the control module by the V2X communication device in particular by means of a data bus, for example a CAN or Ethernet.

It is understood that both during storing of the data received by means of V2X communication and during forwarding, a vehicle-to-X message comprising the data can be both completely stored or respectively forwarded and can be only partially stored or respectively forwarded.

According to a further development, the first computing apparatus is connected in a suitable manner to a V2X transceiver comprised by the V2X communication device by means of a SPI data bus in order to transmit data.

In accordance with an embodiment, the second computing apparatus is designed to realize a lower safety integrity level than the first computing apparatus. The comparison apparatus and/or the data memory are configured, according to a further development, to realize a safety integrity level which is consistent with the first computing apparatus.

In accordance with an embodiment, the second computing apparatus is designed to realize an ASIL QM safety integrity level and the first computing apparatus is designed to realize an ASIL B safety integrity level.

In accordance with an embodiment, the second computing apparatus transmits a comparison request to the comparison apparatus together with the data.

In accordance with an embodiment, an identifier for identifying the data is saved for the data stored in the data memory, wherein the comparison request contains a respective identifier of the data to be compared.

In accordance with an embodiment, the data is output to the control module by means of the first computing apparatus.

In accordance with an embodiment, the data memory is designed as a secured TCM ("tightly coupled memory"). The securing can be effected by means of an error correcting method (Error Correcting Code; ECC).

In accordance with an embodiment, the data are deleted from the data memory in response to the conclusion of the comparison test, and/or a result of the comparison test is sent to the second computing apparatus.

In accordance with an embodiment, one or more of the following measures is carried out in response to the comparison test not being passed:
- stopping and/or re-starting and/or re-setting of an application which is run by the second computing apparatus and which processes the data,
- change of a storage region of a data memory assigned to the second computing apparatus and/or of a computing core utilizing the data or physical computing region, and/or
- periodic re-setting with a shortened cycle duration of an application utilizing the data, if a repetition of erroneous comparison results is established after similar times.

A restoring can reduce any corrupt regions that might creep in, resulting in particular from unrecognized programming errors. As a result, errors which only occur with the passage of time can be avoided.

If the errors are captured and stored in a more differentiated manner, individual applications run by means of the second computing apparatus can also be observed independently of each other.

However, it is only possible to change the computing cores or respectively physical computing regions if further computing cores or respectively physical computing regions are available. Computing cores or respectively physical computing regions recognized as error-prone can be marked as such in order to conduct a diagnosis.

In accordance with an embodiment, it can be provided that a protocol stack which is run by the second computing apparatus and/or the V2X application are run redundantly by one or preferably more computing cores of the second computing apparatus. By means of a comparison of the results by the second computing apparatus, an error can consequently already be recognized and, if applicable, assigned. In order to ensure safety, a comparison is nevertheless performed with the comparison apparatus according to a further development, in particular if the second computing apparatus is designed e.g. in accordance with ASIL QM and the first computing apparatus or respectively comparison apparatus is designed in accordance with ASIL B. The higher consumption of resources could be viewed as a disadvantage of the redundancy concept. Furthermore, it is not necessarily ensured that all of the errors can be intercepted if some hardware units are not duplicated and there is therefore a single source of errors.

In accordance with an embodiment, the first computing apparatus is configured to carry out a pre-processing in order to filter V2X messages received by means of the vehicle-to-X communication, wherein only a portion of the V2X messages are further processed in accordance with an aspect of the invention depending on the pre-processing.

In accordance with an embodiment, data regarding the vehicle such as, for example, the ego position or ego speed can be stored, according to a further development, in the data memory, which data are in particular used by the second computing apparatus. To this end, the data can likewise be stored by the first computing apparatus and provided to the second computing apparatus and can be further processed according to an embodiment of the invention. As a result, the safety can be further increased.

In accordance with an embodiment, the number of the successful and/or erroneous comparison tests is established in the result. Furthermore, the type of errors occurring can be established. Information regarding this can be expedient for further diagnoses regarding the error causes.

According to a further development, the established number of the successful comparison tests in the result and/or the erroneous comparison tests in the result can be utilized according to one or more of the following embodiments:
- If the number of erroneous comparison tests in the result and/or a ratio of the number of the erroneous comparison tests in the result to the successful comparison tests in the result exceeds a threshold, the V2X communication is suspended and/or an error is recorded in the error memory and/or an occupant of the vehicle, in particular the driver, is informed accordingly.

Furthermore, an aspect of the invention relates to a vehicle-to-X communication device, comprising:
- a first computing apparatus for data processing,
- a second computing apparatus for data processing,
- a receiving apparatus for receiving vehicle-to-X messages by means of an antenna,
- a transmitting apparatus for transmitting data to a control module, and
- a comparison apparatus, in particular comprised by the first computing apparatus, wherein
- the first computing apparatus is configured to store data received by means of the receiving apparatus in a data memory, in particular comprised by the first computing apparatus, and to forward the data to the second computing apparatus, wherein
- the second computing apparatus is configured to establish whether an action is to be triggered for the data and, in response to the fact that an action is to be triggered, to transmit the data to the comparison apparatus, wherein
- the comparison apparatus is configured to carry out a comparison test for the data provided by the second computing apparatus with the data stored in the data memory and to output a signal displaying the result in response to the comparison test being passed, and wherein
- the V2X communication device is configured to output the data and/or a control instruction and/or a warning message in response to the signal for provision by means of the transmitting apparatus to the control module.

Moreover, an aspect of the invention relates to a computing apparatus which is configured to carry out a method as described further above with reference to a method to be carried out in a computing apparatus. Moreover, an aspect of the invention relates to a control module which is configured to carry out a method as described further above with reference to a method to be carried out in a control module. Recourse can be had to all of the embodiments and variants described herein regarding the respective methods.

A computing apparatus can be any apparatus which is configured in order to process at least one of the indicated signals. For example, the computing apparatus can be a processor, an ASIC, a FPGA, a digital signal processor, a Central Processing Unit (CPU), a Multi-Purpose Processor (MPP) or similar. In accordance with an embodiment, a so-called ARM Cortex A35 core is used as the second computing apparatus and a so-called ARM M4 core is used as the first computing apparatus.

In a further development of the indicated device, the indicated device has a memory and a processor. The indicated method is recorded in the memory in the form of a computer program and the processor is provided to carry out the method, if the computer program is loaded from the memory into the processor.

According to a further aspect of the invention, a computer program comprises program code means in order to conduct all of the steps of one of the indicated methods, if the computer program is run on a computer or one of the indicated devices.

According to a further aspect of the invention, a computer program product contains a program code which is stored on a computer-readable data carrier and which, if it is run on a data processing apparatus, performs one of the indicated methods.

An aspect of the invention further relates to the use of an embodiment of the V2X communication device according to an aspect of the invention in a vehicle.

A vehicle can be a motor vehicle, in particular a passenger car, a truck, a motorcycle, an electric vehicle or a hybrid motor vehicle, a watercraft or an aircraft.

BRIEF DESCRIPTION OF THE DRAWINGS

The person skilled in the art will infer further features and advantages from the embodiment example described below with reference to the appended figure, wherein.

DETAILED DESCRIPTION OF THE PREFERRED EMBODIMENTS

Figure 1:
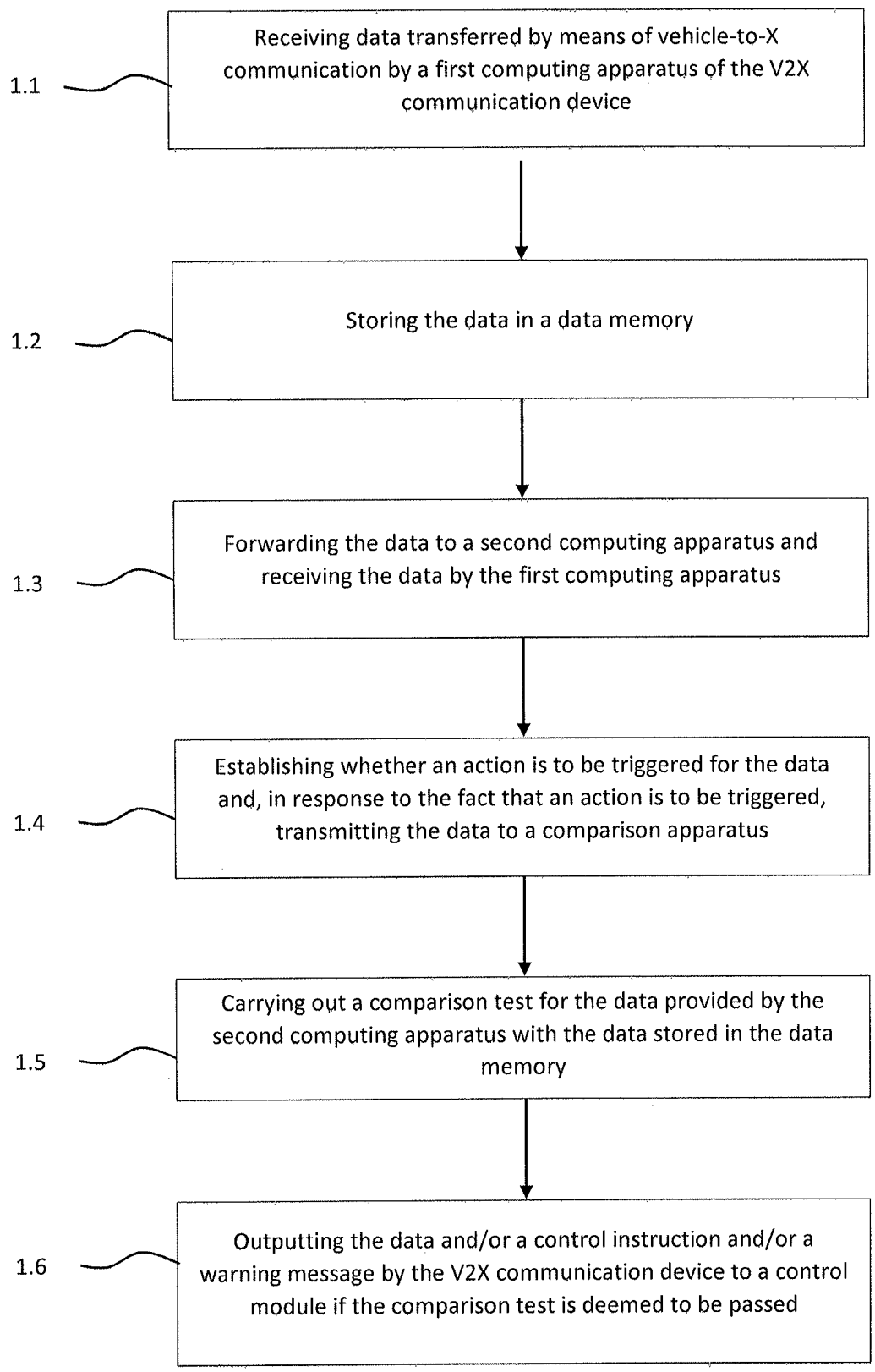
FIG. 1: shows an exemplary embodiment of the method according to an aspect of the invention.

FIG. 1 shows an exemplary embodiment of the method for ensuring the integrity of data sent by a V2X communication device of a vehicle to a control module of the vehicle to ensure operational safety according to an aspect of the invention. In a step 1.1, data transferred by means of vehicle-to-X communication are received by a first computing apparatus of the V2X communication device and are stored, in a step 1.2, in a data memory. In a step 1.3, the first computing apparatus forwards the data to a second computing apparatus which receives the data. The second computing apparatus establishes, in a step 1.4, whether an action is to be triggered for the received data and, in response to the fact that an action is to be triggered, transmits the data to a comparison apparatus in the first computing apparatus. The comparison apparatus in the first computing apparatus conducts, in a step 1.5, a comparison test for the data provided by the second computing apparatus with the data stored in the data memory, wherein, in a step 1.6, in response to the comparison test being passed, the data and/or a control instruction and/or a warning message is/are output by the V2X communication device to the control module.

Figure 2:
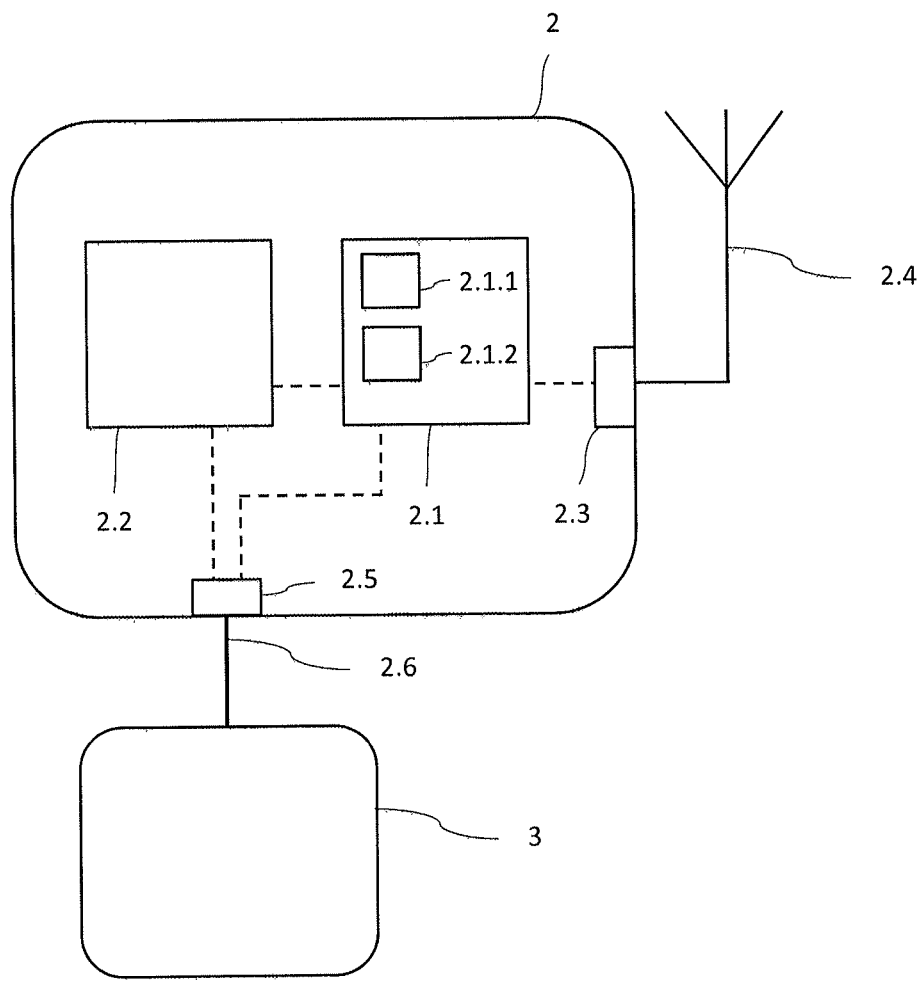
FIG. 2: shows an exemplary embodiment of the vehicle-to-X communication device according to an aspect of the invention.

FIG. 2 shows an exemplary embodiment of the vehicle-to-X (V2X) communication device 2, comprising a first computing apparatus 2.1 for data processing as well as a second computing apparatus 2.2 for data processing. Furthermore, the V2X communication device 2 has a receiving apparatus 2.3 for receiving vehicle-to-X messages by means of an antenna 2.4.

The first computing apparatus 2.1 is configured to store data received by means of the receiving apparatus 2.3 in a data memory 2.1.1 of the first computing unit 2.1 and to forward the data to the second computing apparatus 2.2. The second computing apparatus 2.2 is configured to establish whether an action is to be triggered for the data and, in response to the fact that an action is to be triggered, to transmit the data to a comparison apparatus 2.1.2 of the first computing unit 2.1, wherein the comparison apparatus 2.1.2 is configured to perform a comparison test for the data provided by the second computing apparatus 2.2 with the data stored in the data memory 2.1.1 and to output a signal displaying the result in response to the comparison test being passed. Furthermore, the first computing apparatus 2.1 is in particular configured, in response to the signal, to output the data and/or a control instruction and/or a warning message directly to the transmitting apparatus 2.5 and/or to the second computing apparatus 2.2, wherein the second computing apparatus 2.2 can also carry out an output to the transmitting apparatus 2.5. The V2X communication device 2 is configured to output, by means of the transmitting apparatus 2.5, the data and/or the control instruction and/or the warning message by way of example by means of a data bus 2.6 to a control module 3.

If in the course of the proceedings it transpires that a feature or a group of features is not absolutely necessary, then the applicant here and now seeks a wording of at least one independent claim, no longer comprising the feature or the group of features. This may, for example, involve a sub-combination of a claim existing as at the application date or a sub-combination of a claim existing as at the application date restricted by further features. Such claims or combinations of features, which are to be newly worded, are understood to also be covered by the disclosure of this application.

It is further pointed out that configurations, features and variants of aspects of the invention, which are described in the various embodiments or embodiment examples and/or shown in the figures, can be combined with one another as desired. Individual or multiple features are interchangeable as desired. Resulting combinations of features are understood to also be covered by the disclosure of this application.

Back references in dependent claims should not be construed as a waiver of the right to independent, objective protection for the features of the subclaims referred back to. These features can also be used in any combination with other features.

Features which are only disclosed in the description or features which are disclosed in the description or a claim only in conjunction with other features can, in principle, be of independent inventive relevance. They can therefore also be included separately in claims to distinguish from the prior art.

It should be pointed out in general that vehicle-to-X communication means, in particular, a direct communication between vehicles and/or between vehicles and infrastructure facilities. For example, therefore, vehicle-to-vehicle communication or vehicle-to-infrastructure communication may be involved. Where communication between vehicles is referred to within the framework of this application, this can essentially, for example, take place within the framework of vehicle-to-vehicle communication, which typically takes place without the intermediary of a mobile network or a similar external infrastructure and which can therefore be distinguished from other solutions which, for example, are based on a mobile network. For example, vehicle-to-X communication can take place using the standards IEEE 802.11p or IEEE 1609.4 or 4G or 5G, including in particular PC5 or sidelink. Vehicle-to-X communication can also be referred to as C2X communication or V2X communication. The sub-areas can be referred to as C2C (Car-to-Car), V2V (Vehicle-to-Vehicle) or C2I (Car-to-Infrastructure), V2I (Vehicle-to-Infrastructure). However, an aspect of the invention expressly does include vehicle-to-X communication with the intermediary of, for example, a mobile network, so-called Cellular V2X or respectively C-V2X.

The invention claimed is:

1. A method for ensuring integrity of data sent by a V2X communication device of a vehicle to a control module to ensure operational safety, comprising:
    receiving, by a first computing apparatus of the V2X communication device, data transmitted by vehicle-to-X communication from another V2X communication device of another vehicle or an infrastructure device;
    storing the data in a data memory of the V2X communication device;
    forwarding, by the first computing apparatus, the data to a second computing apparatus of the V2X communication device;
    receiving the data by the second computing apparatus; and
    establishing, by the second computing apparatus, whether an action is to be triggered for the data, the action including controlling the vehicle based on the data, and, in response to establishing that an action is to be triggered:
        transmitting, by the second computing apparatus, the data to a comparison apparatus external to the second computing apparatus, and
        carrying out, by the comparison apparatus, a comparison test by comparing the data transmitted by the second computing apparatus with the data stored in the data memory and, in response to the comparison test being passed, outputting the data and/or a control instruction and/or a warning message by the V2X communication device to a control module,
    wherein when the action is not to be triggered, the second computing apparatus does not transmit the data to the comparison apparatus and the comparison apparatus does not perform the comparison test on the data.

2. The method according to claim 1, wherein the second computing apparatus is designed to realize a lower safety integrity level than the first computing apparatus.

3. The method according to claim 1, wherein the second computing apparatus is designed to realize an ASIL QM safety integrity level and the first computing apparatus is designed to realize an ASIL B safety integrity level.

4. The method according to claim 1, wherein the second computing apparatus transmits a comparison request to the comparison apparatus together with the data.

5. The method according to claim 4, wherein an identifier for identifying the data is saved for the data stored in the data memory, and wherein the comparison request contains a respective identifier of the data to be compared.

6. The method according to claim 1, wherein the data is output to the control module by the first computing apparatus.

7. The method according to claim 1, wherein the data memory is a secured TCM ("tightly coupled memory").

8. The method according to claim 1, wherein the data are stored in the data memory by the first computing apparatus and/or the data memory using an error correcting method.

9. The method according to claim 1, wherein data regarding the vehicle are furthermore stored in the data memory and are forwarded to the second computing apparatus.

10. The method according to claim 1, wherein, in response to conclusion of the comparison test, the data are deleted from the data memory and/or a result of the comparison test is sent to the second computing apparatus.

11. The method according to claim 1, wherein, in response to the comparison test not being passed, a result of the failure to pass is sent to the second computing apparatus and furthermore:
    stopping and/or re-starting and/or re-setting of an application which is run by the second computing apparatus and which processes the data,
    change of a storage region of a data memory assigned to the second computing apparatus and/or of a computing core utilizing the data or physical computing region, and/or
    periodic re-setting with a shortened cycle duration of an application utilizing the data, if a repetition of erroneous comparison results is established after similar times.

12. The method according to claim 1, wherein a number of the successful and/or erroneous comparison tests in the result is established, wherein the V2X communication is suspended and/or an error is recorded in the error memory and/or an occupant of the vehicle is informed accordingly, if the number of erroneous comparison tests in the result and/or a ratio of the number of the erroneous comparison tests in the result to the successful comparison tests in the result exceeds a threshold.

13. A vehicle-to-X (V2X) communication device of a vehicle, the V2X communication device comprising:
    a first computing apparatus for data processing,
    a second computing apparatus for data processing,
    a receiving apparatus for receiving V2X messages by an antenna, the V2X received messages transmitted by vehicle-to-X communication from another V2X communication device of another vehicle or an infrastructure device,
    a transmitting apparatus for transmitting data to a control module of the vehicle, and
    a comparison apparatus of the vehicle,
    wherein the first computing apparatus is configured to store data of the V2X messages received by the receiving apparatus in a data memory of the V2X communication device, and to forward the data to the second computing apparatus,
    wherein the second computing apparatus is configured to receive the data from the first computing apparatus, and establish whether an action is to be triggered for the data, the action including controlling the vehicle based on the data, and, in response to establishing that an action is to be triggered:
        transmit the data to the comparison apparatus external to the second computing apparatus, and
        perform, by the comparison apparatus, a comparison test by comparing the data transmitted by the second computing apparatus with the data stored in the data memory, and output a signal displaying the result in response to the comparison test being passed, wherein when the action is not to be triggered, the second computing apparatus does not transmit the data to the comparison apparatus and the comparison apparatus does not perform the comparison test on the data, and wherein the V2X communication device is configured to output, to the control module, the data and/or a control instruction and/or a warning message in response to the signal.

14. The vehicle-to-X communication device according to claim 13, configured to carry out a method for ensuring integrity of data sent by a V2X communication device of a vehicle to a control module to ensure operational safety, comprising:

receiving data transferred by vehicle-to-X communication by the first computing apparatus of the V2X communication device, storing the data in the data memory, forwarding the data to the second computing apparatus, receiving the data by the second computing apparatus, establishing whether an action is to be triggered for the data and, in response to the fact that an action is to be triggered, transmitting the data to the comparison apparatus, carrying out the comparison test for the data provided by the second computing apparatus with the data stored in the data memory and, in response to the comparison test being passed, and outputting the data and/or the control instruction and/or the warning message by the V2X communication device to a control module.

15. Use of the V2X communication device according to claim 13 in a vehicle.

16. Use of the V2X communication device according to claim 14 in a vehicle .

* * * * *